(12) United States Patent
Durbin et al.

(10) Patent No.: US 8,814,183 B1
(45) Date of Patent: Aug. 26, 2014

(54) RUNNING STROLLER

(75) Inventors: Gregory P. Durbin, Morrison, CO (US); Andrew P. Lull, Boulder, CO (US)

(73) Assignee: Gregory P. Durbin, Morrison, CO (US)

( * ) Notice: Subject to any disclaimer, the term of this patent is extended or adjusted under 35 U.S.C. 154(b) by 933 days.

(21) Appl. No.: 12/648,080

(22) Filed: Dec. 28, 2009

(51) Int. Cl.
*B62B 7/04* (2006.01)

(52) U.S. Cl.
USPC .................................. 280/47.38; 280/87.042

(58) Field of Classification Search
USPC .......................................... 280/87.042, 47.38
See application file for complete search history.

(56) References Cited

U.S. PATENT DOCUMENTS

| | | | | |
|---|---|---|---|---|
| 4,526,392 | A * | 7/1985 | Berkstresser | 280/282 |
| 5,562,300 | A * | 10/1996 | Nelson | 280/655.1 |
| 6,302,421 | B1 * | 10/2001 | Lee | 280/210 |
| 6,572,130 | B2 * | 6/2003 | Greene et al. | 280/266 |
| 2003/0102654 | A1 * | 6/2003 | Shapiro | 280/650 |
| 2008/0309039 | A1 * | 12/2008 | Bailey et al. | 280/47.34 |

* cited by examiner

*Primary Examiner* — J. Allen Shriver, II
*Assistant Examiner* — Bryan Evans
(74) *Attorney, Agent, or Firm* — Polsinelli PC

(57) ABSTRACT

Aspects of the present invention involve a steerable running stroller including a lower frame assembly supporting two rear wheels and an upper frame assembly supporting a front wheel. A self centering hinge mechanism, which may define a physical pivot axis or a virtual pivot axis, is coupled between the lower frame assembly and the upper frame assembly. The pivot axis defined by the self centering hinge mechanism is positioned at an angle, which may be an obtuse angle, such that the front wheel is normally in a straight orientation with respect to the rear wheels, and when a user imparts a turning force, the front wheel both turns and tilts relative to the rear wheels. When the turning force is removed, the self centering hinge mechanism acts to return the running stroller to a straight rolling orientation.

20 Claims, 25 Drawing Sheets

RUNNING STROLLER

CROSS REFERENCE TO RELATED APPLICATION

The present application is related to U.S. application Ser. No. 11/745,437 "Steerable and Convertible Running Stroller" filed on May 7, 2007, claiming priority to provisional application no. 60/746,596 filed on May 5, 2006, which are hereby incorporated by reference herein.

FIELD OF THE INVENTION

Aspects of the present invention involve a stroller, and particularly a steerable running stroller.

BACKGROUND

Strollers are a popular option for parents to transport babies and young children. So called "jogging strollers" were developed as a way for parents to go for a jog or run and take their young children. Jogging strollers may also be used in the same manner as a conventional stroller to transport children in a shopping center, etc. One significant drawback of many conventional jogging strollers is that they have three fixedly mounted wheels and there is no way to mechanically steer the stroller. As such, while walking, jogging or running, it is difficult to turn the stroller. Often a parent has to pivot or lever the front wheel off of the ground by pressing down on handles at the rear of the stroller, with the front wheel off the ground, a parent may steer the stroller. Steering difficulty is exaggerated for heavier children and in double jogging strollers, i.e., those adapted to carry two children. Furthermore, at higher speeds, or on uneven surfaces, steering with the front wheel off the ground can be difficult and cause unstable stroller movement.

Some conventional jogging strollers have incorporated a castor wheel or swivel wheel arrangement at the front of the stroller. Such swivel wheel arrangements allow for a tight turning radius, ideal for walking or shopping in a mall and the like. However, swivel wheels can be unstable when running, especially when running fast, running in snow or sand, or running in bumps. Additionally, swivel wheel jogging strollers can be unstable if the runner temporarily lets go of the stroller while jogging for any number of possible reasons. Hence, swivel wheel jogging stroller manufactures offer a lock-out mechanism to lock the swivel wheel in a straight orientation and recommend such lock out be employed when running.

It is with these various issues in mind, as well as others, that various aspects of the running strollers described herein were developed.

SUMMARY

Aspects of the present disclosure involve a steerable running stroller comprising a first frame assembly rotatably supporting a first rear wheel and a second rear wheel. The running stroller further involves a second frame assembly including a front wheel and a handle assembly, the second frame assembly further including a seat configured to support a child. A hinge couples the first frame assembly with the second frame assembly. The hinge is oriented at an obtuse angle. The second frame assembly is configured to displace from a neutral orientation relative to the first frame assembly when a turning force is applied, and configured to return to the neutral orientation when the turning force is removed.

Aspects of the present disclosure further involve a steerable running stroller with a lower frame assembly. A first rear wheel and a second rear wheel are rotatably supported on the lower frame assembly. The running stroller further includes an upper frame assembly pivotally coupled with the lower frame assembly, with at least one front wheel supported on the upper frame assembly. At least one seat is operably supported on the upper frame assembly. Finally, the running stroller includes a self centering hinge mechanism defining a pivot axis orientated at an obtuse angle relative to a line between a front axis defined by the front wheel and a rear axis defined by the rear wheels, the self centering hinge mechanism coupled between the upper frame assembly and the lower frame assembly, the self centering hinge mechanism configured to normally orient the running stroller in a straight orientation with the front wheel in alignment with the first and second rear wheels, the self centering hinge mechanism further arranged to impart a return force between the upper frame assembly and the lower frame assembly when the running stroller is pivoted about the pivot axis when executing a turn such that the front wheel turns and leans into a turn.

An additional aspect of the present disclosure involves a steerable running stroller comprising a first frame assembly supporting a first rear wheel and a second rear wheel. The running stroller further includes a second frame assembly supporting a front wheel, the second frame assembly supporting a seat configured to carry child. A steering assembly is coupled to the second frame assembly. Finally, the running stroller includes at least one self centering pivot member coupled between the first frame member and the second frame member, the at least one self centering pivot member defining a pivot axis at an obtuse angle of between 130 degrees and 160 degrees between the front wheel and the rear wheels, the self centering hinge positioned between the front wheel and the rear wheels, such that the first rear wheel and the second rear wheel counter steer the front wheel in response to a turning force on the steering assembly and the front wheel both turns and tilts in response to the turning force. FIGS. 1A-1D are an isometric view, top view, side view, and front view respectively, of a first implementation of a steerable running stroller conforming to aspects of the present invention, the stroller in a straight orientation;

DETAILED DESCRIPTION

Figure 1A:
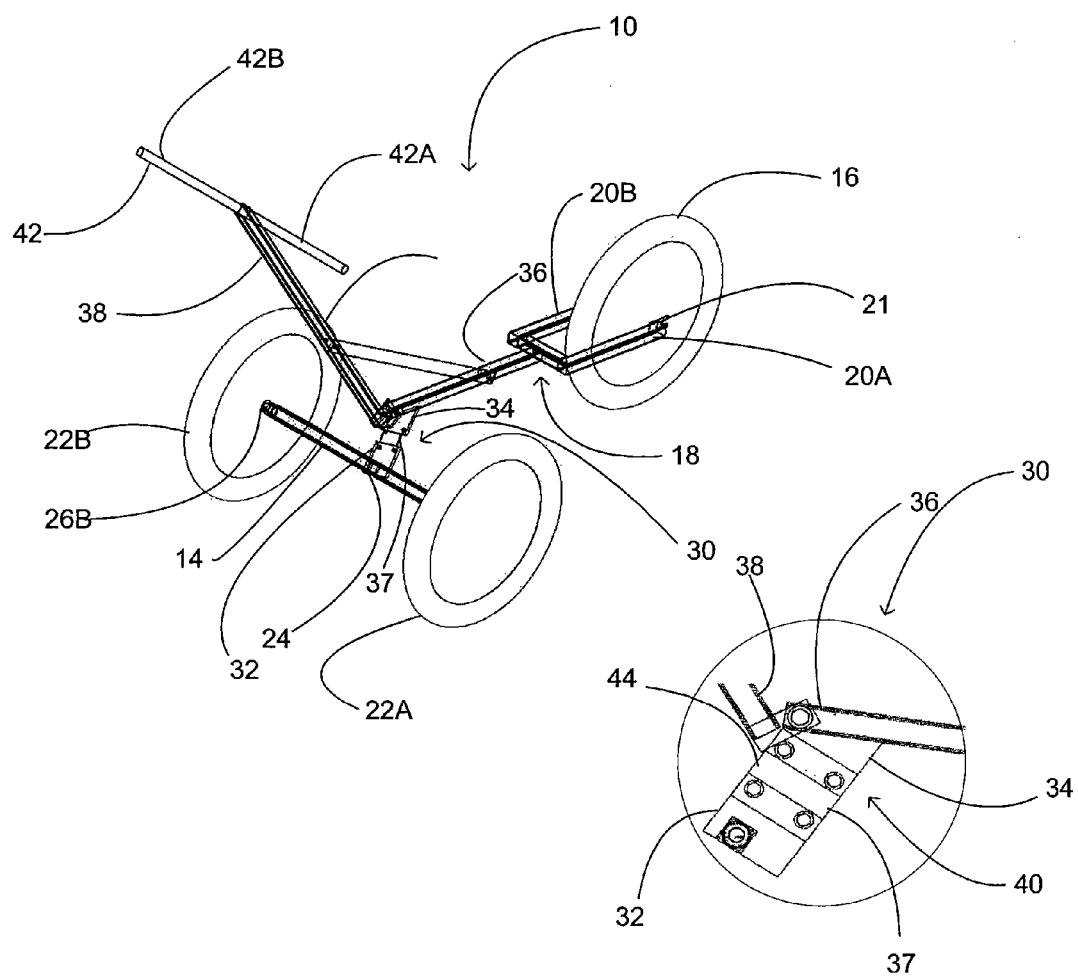
FIGS. 1A-1D are an isometric view, top view, side view and front view, respectively, of a steerable stroller, according to one embodiment, the stroller in a straight orientation.

Aspects of the present invention involve a running stroller configured with a front wheel that may be angularly or pivotally controlled with respect to a pair of rear wheels providing stable turning during jogging or running. In one particular configuration, the stroller includes a pair of rear wheels rotatably supported to rotate about a common geometric axis defined by a rear wheel frame assembly, also referred to as a first or lower frame assembly. The rear wheels may or may not be supported on a common physical axle. A front wheel is rotatably supported about a front axis. The front axis is defined in the front region of a front wheel frame assembly. The front wheel frame assembly, also referred to as an upper or second frame assembly, supports the front wheel as well as a seat assembly. A steering interface, such as a handlebar assembly, is operably associated with the front wheel frame assembly.

To facilitate turning of the running stroller, the front wheel frame assembly is flexibly and resiliently coupled with the rear wheel frame assembly. In one particular example, the front wheel frame assembly is coupled with the rear wheel frame assembly by way of a self-centering hinge. The self centering hinge may be a mechanical hinge with elastic members, like a spring hinge, that pivots around a mechanical hinge axis in response to turning forces and returns to a neutral orientation when the turning force is removed. The self centering hinge may also include a leaf spring or other flexible resilient member, in which case the hinge may flex, e.g., bend and/or twist, in response to steering input forces, and when the steering input forces are removed, the hinge resiliently returns to its neutral orientation, the orientation without any steering inputs. Hence, the front wheel frame assembly, including the front wheel, are able to bend, pivot and/or twist relative to the rear wheel frame assembly and the rear wheels. Stated differently, by way of the hinge connection between the front frame assembly and the rear frame assembly, the front wheel and front frame assembly may be turned left or right with respect to the rear frame assembly and corresponding rear wheels to cause the stroller to turn during use. Moreover, the position and configuration of the self centering hinge facilitates tilting of the front wheel left or right during a respective left or right turn such that the running stroller, particularly the upper frame assembly supporting the seat, is able to "lean" into a turn.

In one particular implementation, the self centering hinge provides a virtual pivot or virtual hinge coupling the front wheel frame assembly and the rear wheel frame assembly. In contrast to a mechanical hinge with a pin, shaft, pivot or the like, a structure implementing the virtual hinge is considered "virtual" as there is not pin or shaft upon which something rotates, rather the hinge is a solid piece that bends and returns to its shape. The virtual pivot may be carbon fiber, fiber glass, spring steel, wood or wood composites, rubber, synthetic rubber, or other materials, or combinations thereof, such that the virtual hinge is both flexible (able to bend and/or twist) and resilient (able to return to shape after bending and/or twisting). The self centering hinge may be provided by a leaf spring. The virtual hinge may provide for multidimensional pivotal movement about a virtual axis (VA) between the lower, first, frame and upper, second, frame assembly. Hence, the upper frame pivots with respect to the lower frame assembly thereby turning the front wheel (e.g., the front axis becomes non-parallel to the rear axis in a horizontal plane), the upper frame may also tilt with respect to the rear frame assembly to provide a tilt of the front wheel (e.g., the front axis becomes non-parallel to the rear axis in the vertical plane). Stated differently, in response to a turning input at the handlebars, the virtual pivot may bend and/or twist to both turn the front wheel relative to the rear wheels as well as lean the front wheel relative to the rear wheels. Hence, the front wheel and the associated seat tilt during a turn, which assists the turn and assists in overall running stroller stability.

The self centering hinge connection between the upper and lower frame assemblies may also be provided with a mechanical hinge or mechanical joint structure. A mechanical hinge provides a shaft, pin, or other member at about the same location and orientation as the virtual axis provided by the virtual hinge. Such a mechanical hinge is used in combination with some form of flexible resilient member or members that orients the mechanical hinge in a straight (neutral) orientation without steering inputs and returns the hinge to a straight orientation after steering inputs are removed. For example, a spring hinge with proper dampening and spring rate may be used.

Whether provided with a mechanical hinge, a virtual hinge, or otherwise, the self-centering hinge mechanism may be coupled between the lower frame assembly and the upper frame assembly. The self centering hinge operates to center the upper frame assembly after it is turned left or right. As used herein, the term "self centering hinge" refers to an arrangement of components that operate to orient and maintain the upper, second, frame assembly relative to the lower, first, frame assembly in a straight orientation so that the running stroller rolls in a substantially straight line when no turning forces are applied. The self centering hinge also provide a return force on the upper frame assembly when the frame and the associated front wheel are turned from a straight orientation, the return force working to reorient the front frame in the straight orientation when turning forces are lessened or removed. Depending on the self centering hinge geometry, the spring geometry, materials, and the like, the spring and/or dampening forces, such as spring rate, may be linear or non-linear during a turn and when returning the running stroller to a neutral orientation after the turn. The self-centering hinge may involve a discrete member or assembly that is in some form coupled between the upper frame assembly, or related components of the upper frame assembly associated with the front wheel and seat structure, and any components supporting the rear wheels. Thus, for example, the self-centering hinge may be coupled with the upper frame assembly, or other member, assembly, or mechanism that supports the front wheel, and further coupled with the lower assembly, framework, member, or mechanism that supports the rear wheels. The self centering hinge may include one or more flexible and resilient members, such as one or more elastic members, a spring (tension or compression, leaf spring, coil spring, Belleville spring, torsion spring, rubber band, etc.) or other spring like structures, or an assembly of components displaying spring-like or elastic properties, electromechanical assemblies, hydraulic arrangements, etc.

Referring now to FIGS. 1A-1D, one particular example of a steerable running stroller 10 will be described in greater detail. The steerable stroller includes an upper, front wheel, frame assembly 12 flexibly and resiliently coupled with a lower, rear wheel, frame assembly 14. A front wheel 6 is rotatably supported at the front of the front wheel frame assembly. In the FIG. 1 implementation, the front wheel frame assembly includes a fork 18 including two tines (20A, 20B) at the front of the jogger 10. An axle 21 of the front wheel, defining the front axis, is supported by the tines such that the front wheel is between the tines. This is merely one possible implementation, others might involve a single tine supporting the axle, as well as other arrangements to support a wheel at in the front area of the front wheel frame assembly. The fork may extend forwardly as shown in FIG. 1, and may also be configured at different relative angles, such that fork extends both forwardly and downwardly, and the like.

The rear wheel frame assembly 14 supports the rear wheels 22A, 22B. In the example shown in FIGS. 1A-1D, the rear wheel frame assembly includes an axle member 24 with axle housings 26A, 26B at the outside ends of the axle member. The axle housings are adapted to receive axles 28A, 28B of each rear wheel 22 or a common axle thereby rotatably supporting each wheel. In one implementation, the axle housings are coupled to the outside ends of the lower axle member 24 and arranged to support the two rear wheels such that the rear axles of each wheel are coaxial. It is also possible to arrange the axle housings so that the rear wheels are cambered. In such a cambered arrangement, the respective tops of each rear wheel are relatively closer than the respective bottoms of each rear wheel.

The rear wheel frame assembly is flexibly and resiliently coupled with the front wheel frame assembly at a self-centering hinge 30. In one example, the self-centering hinge involves a carbon fiber member 37 connected between the front and rear frame assemblies. More particularly, in the implementation illustrated in FIGS. 1A-1C, as well as others, a first clamp member 32 is connected with the axle member 24. A second clamp member 34 is coupled with a lower frame member 36 of the front wheel frame assembly 12. In one particular implementation, each clamp, which may be rigid members, is arranged generally in a plane (P) along the longitudinal center line of the stroller. The longitudinal center line is between a point midway between the rear wheels and a point along the front wheel, as shown in the top view of FIG. 1B. The lower frame member is positioned generally along the longitudinal center line of the stroller, in the neutral straight orientation.

In one particular arrangement, the self-centering hinge 30 includes one or more carbon fiber plate members 37 clamped between the first clamp member 32 and the second clamp member 34. When assembled, there is a rectangular portion 40 of the carbon fibers members exposed between the clamp members. In a neutral position, without any turning or other forces imparted on the carbon members, the upper frame assembly is positioned relative to the lower frame assembly such that the front and rear wheels are aligned, as shown in FIGS. 1A-1D. In this orientation, the running stroller 10 will roll in a generally straight line. The carbon fiber plates are flexible and resilient, i.e., they have elastic properties. Hence, the carbon fiber members may be bent about a virtual axis to some degree without failing or permanently deforming. Depending on the fiber orientations, as well as other factors, the members may also be twisted, although the implementation shown is primarily configured for bending. Further, when the force causing the members to deform is removed, the members will return to their neutral orientation. Hence, the virtual hinge holds the running stroller in its neutral straight orientation normally and returns the stroller to the straight orientation after turning forces are removed.

Due to the rigid nature of the clamps 32/34, the exposed portion(s) 40 of the carbon fiber member(s) 37 between the plates are able to bend and/or twist responsive to turning forces. Several factors effect the amount of deformation that may occur in response to application of a turning force. For example, the fiber orientation of the carbon fiber plates, the thickness of a given plate and the thickness of the collection of plates, the fiber orientations of a collection of plates (e.g., fibers arranged parallel to the plate opening, tangential to the plate opening, orthogonal to the plate orientation or some combination of fiber orientations), the shape of the plate and thickness profile of the plate, combination of carbon with other materials, the size and shape of the plate opening, etc., may all, alone or in combination, effect turning of the stroller. In one arrangement, for example, carbon fiber plates were sandwiched between spring steel plates. In another example, rubber plates are sandwiched between every other plate. In other examples, a virtual hinge with carbon fiber plates with the fibers oriented in the same direction or in alternating directions, both aligned with the long axis of the opening and transverse the opening, are used.

Figure 7:
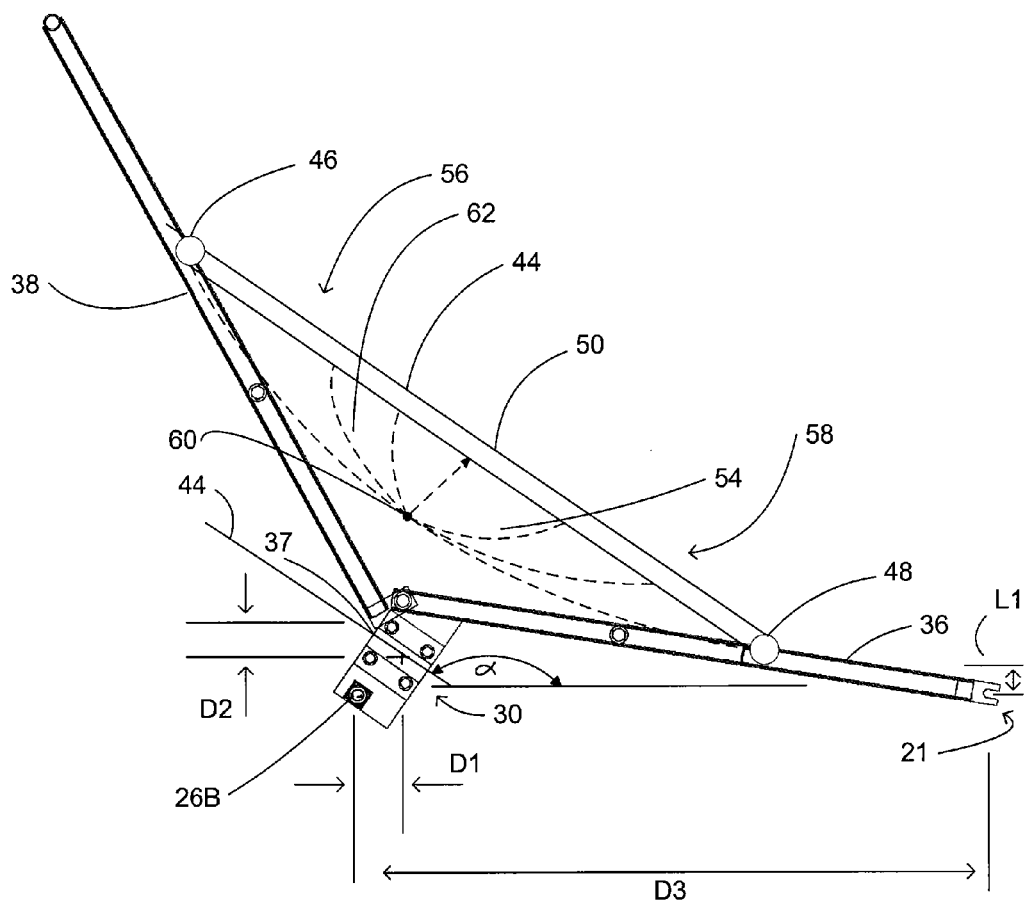
FIG. 7 is a side view of the second implementation of a running stroller.

As illustrated in FIG. 7 and discussed in more detail below, the self centering hinge is positioned at an angle alpha ($\alpha$) relative to a line defined between the front and rear wheel axles. In this example, angle $\alpha$ is an obtuse angle and is about 145 degrees. It is possible to orient the self centering hinge at other angles in a range of 130 to 160 degrees (i.e., +/−15 degrees from the angle shown of 145 degrees). Generally speaking, if the angle is decreased, moving closer to 130 degrees, then the stroller will turn more sharply with less tilt relative to the illustrated 145 degree implementation, and if the angle is increased toward 160 degrees the stroller will turn less sharply with more tilt relative to the illustrated 145 degree implementation. It is possible to use an obtuse angle of between greater than 90 degrees and less than 180 degrees, with attendant impacts on turning radius and tilt.

The provision of the pivotal relationship between the upper, front wheel, frame assembly 14 and the lower, rear wheel, frame assembly 12 allows the front wheel 16 to be pivoted (steered) with respect to the rear wheels 22. An upper frame member 38 extends upwardly and rearwardly from the lower frame member 36, and a steering handle member 42 or some other form of user engagement mechanism forms a part of the upper frame assembly, extending transversely (forming a T) at the rearward/uppermost position of member 38. Member 38 extends upwardly and rearwardly from a rear portion of the frame member 36, with the intersection of members 36 and 38 being above the self centering hinge 30. The steering member 42 (shown in the example of FIG. 1 as a transverse bar) is part of the front wheel frame assembly 12. Forward force applied to the right side 42A of the steering bar causes the front frame to pivot to the left about a hinge or pivot axis 44 of the self centering hinge 30 while forward force on the left side 42B of the steering bar causes the front frame to pivot to the right about the hinge axis 44 (see FIGS. 1A and 7). Due to the angular orientation of the self centering hinge, forward force on the left side or right side of the steering bar also causes the front frame to tilt to the right side or left side, respectively, to thereby impart a tilt to the front wheel. Hence, the front wheel both turns left and tilts so that the top of the front wheel is farther left than the bottom of the front wheel, as shown in FIGS. 2A-3D, responsive to force on the right side 42A of the steering bar. Similarly, as shown in FIGS. 4A-5D, forward force on the left side of the steering bar causes the front wheel to turn right and also tilt such that the top of the front wheel is farther right than the bottom of the front wheel. Through the handle, the user may impart steering forces sufficient to multidimensionally pivot the front frame and front wheel left or right relative to the rear wheels and thus execute a left or right turn.

FIGS. 2-3 illustrate two left turn orientations, with FIGS. 2A-2D illustrating a first left turn orientation of the running stroller of FIG. 1 and FIGS. 3A-3D illustrating a second left turn orientation, greater than the first left turn orientation. The first left turn orientation represents the orientation of the stroller with a first force (F1) applied to the right side 42A of the bar and the second left turn orientation represents the orientation of the stroller with a second force (F2), greater than the first force, applied to the right side 42A of the bar. In contrast, FIGS. 4-5 illustrate two right turn orientations, with FIGS. 4A-4D illustrating a first right turn orientation of the running stroller of FIG. 1 and FIGS. 5A-5D illustrating a second right turn orientation, greater than the first right turn orientation. The first right turn orientation represents the orientation of the stroller with a first force (F3) applied to the left side 42B of the bar and the second right turn orientation represents the orientation of the stroller with a second force (F4), greater than the first force, applied to the left side 42B of the bar.

The turning effect may also be imparted by other forces, alone or in combination, with the forces F1, F2, etc. For example, referring to FIG. 2B, a force F1', a force rearward on the left side 42B of the bar, may be used in conjunction with force F1 to create a torsional force on the hinge, which if force F1 is greater than force F1', will orient the running stroller in the left turn orientation shown. In another example, referring also to FIG. 2B, a force F1'', a force transverse the forward neutral/straight rolling direction of the stroller, may be imparted on the handle member to cause the left turn illustrated.

Figure 4A:
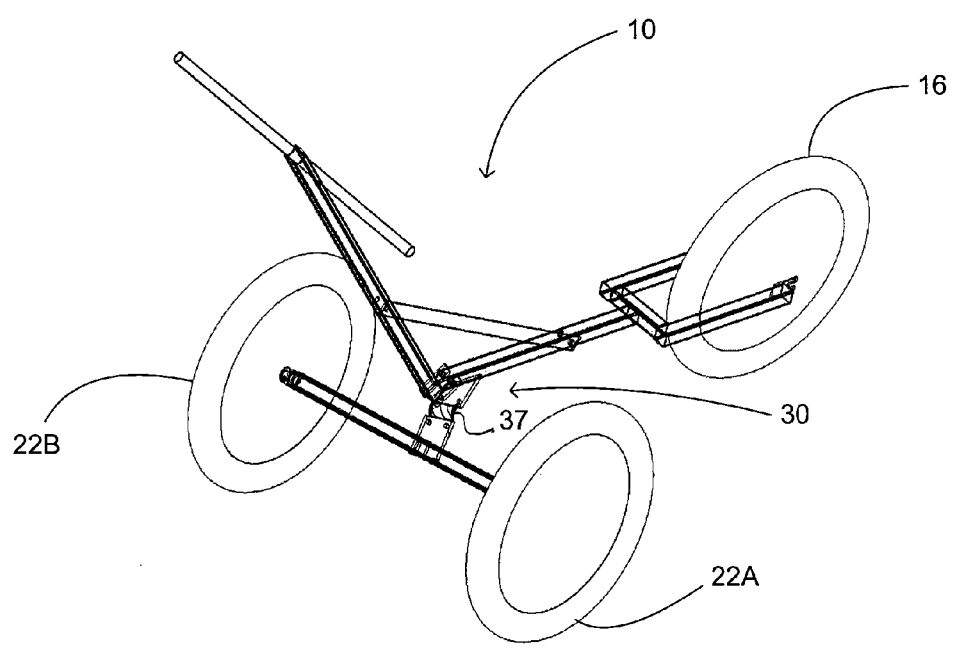
FIGS. 4A-4D are an isometric view, top view, side view and front view, respectively, of the steerable stroller shown in FIGS. 1A-1D, the stroller in a first right turn orientation.
Figure 4B:
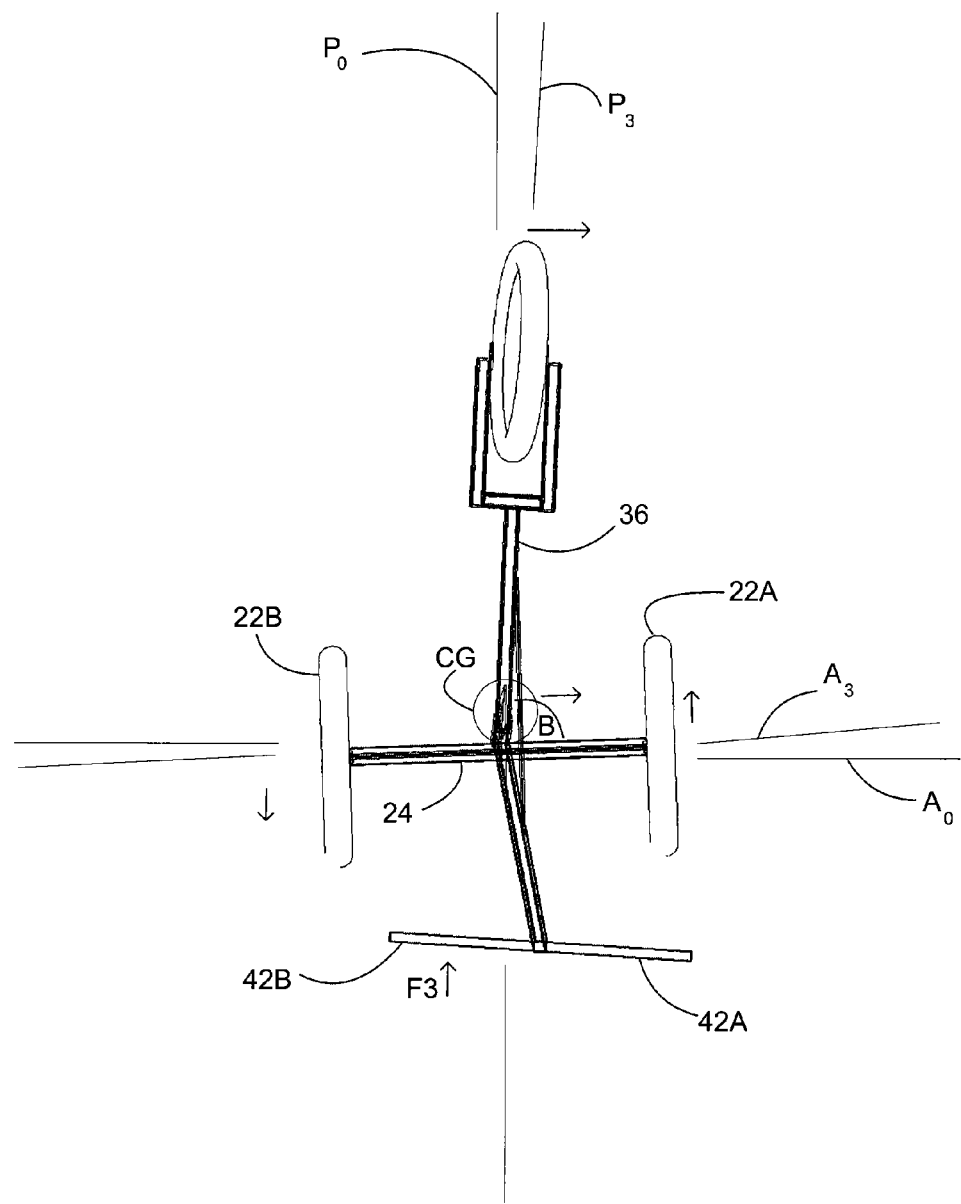
Figure 4C:
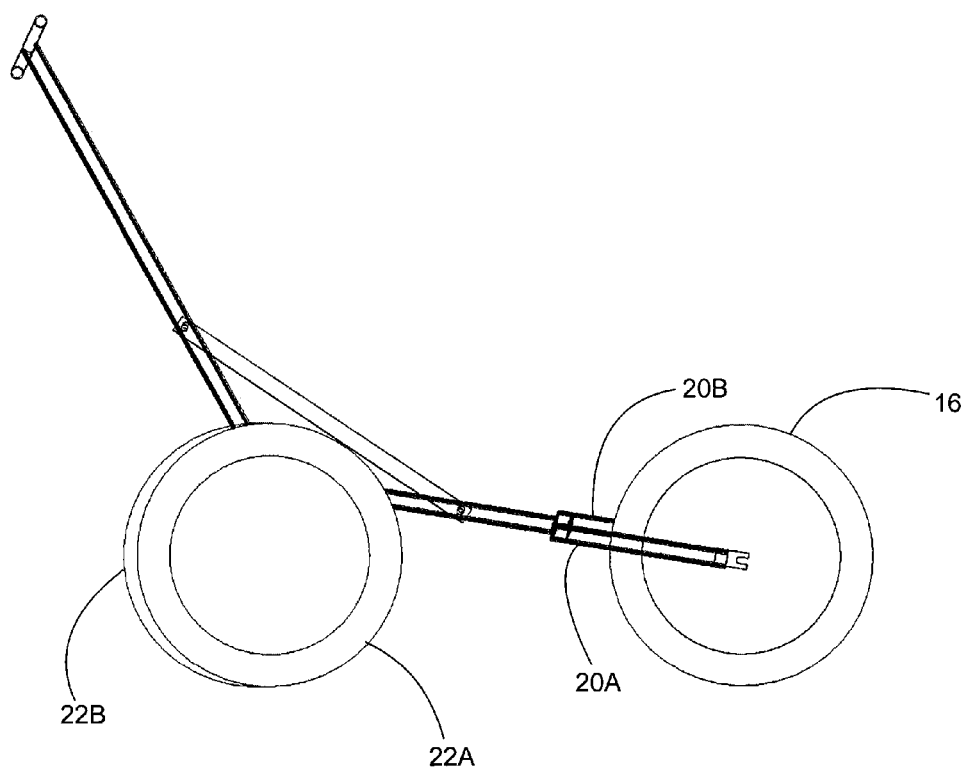
Figure 4D:
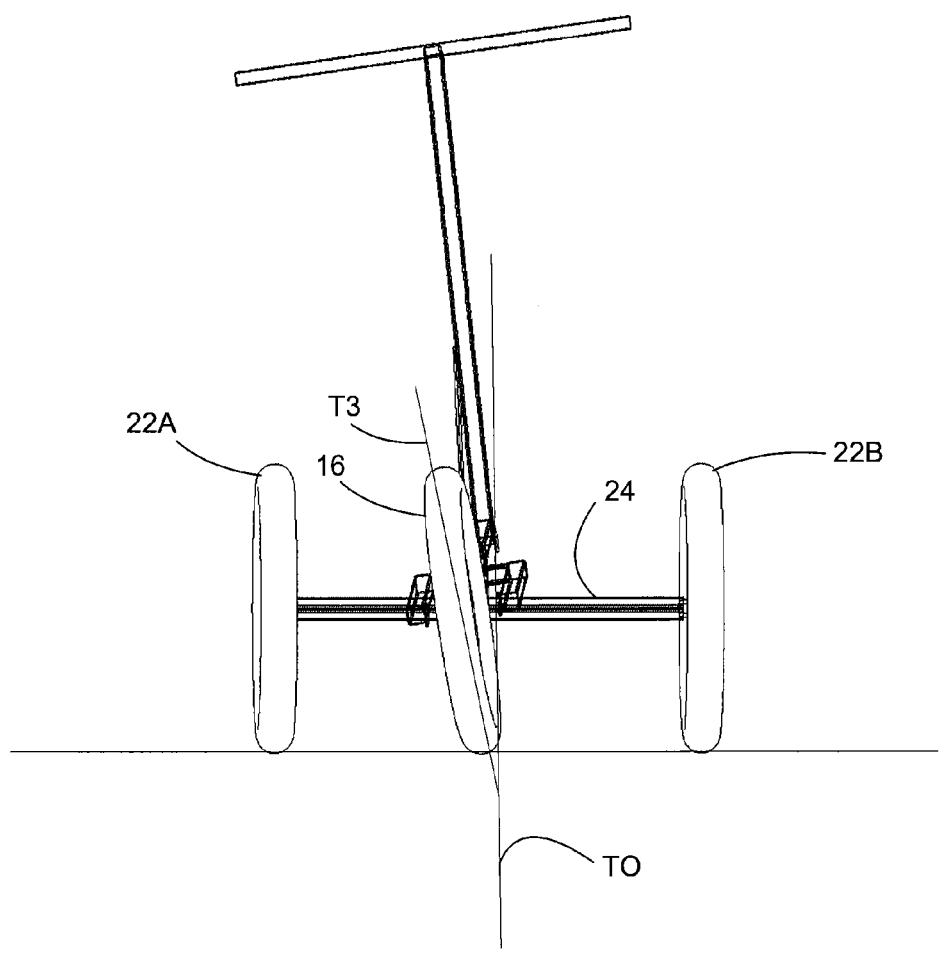
Figure 5A:
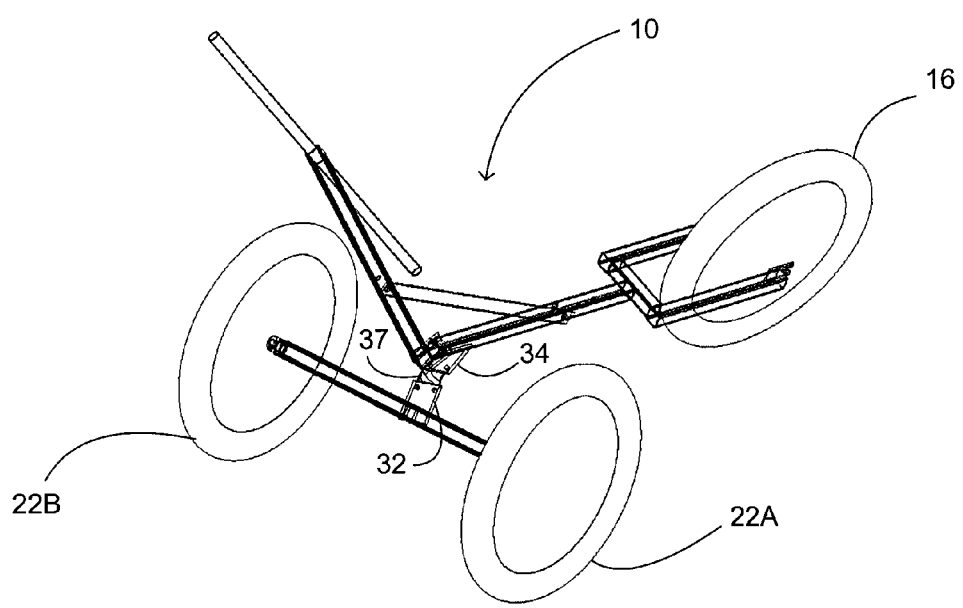
FIGS. 5A-5D are an isometric view, top view, side view and front view, respectively, of the steerable stroller shown in FIGS. 1A-1D, the stroller in a second right turn orientation, the right turn orientation of FIGS. 5A-5D being greater than shown in FIGS. 4A-4D.
Figure 5B:
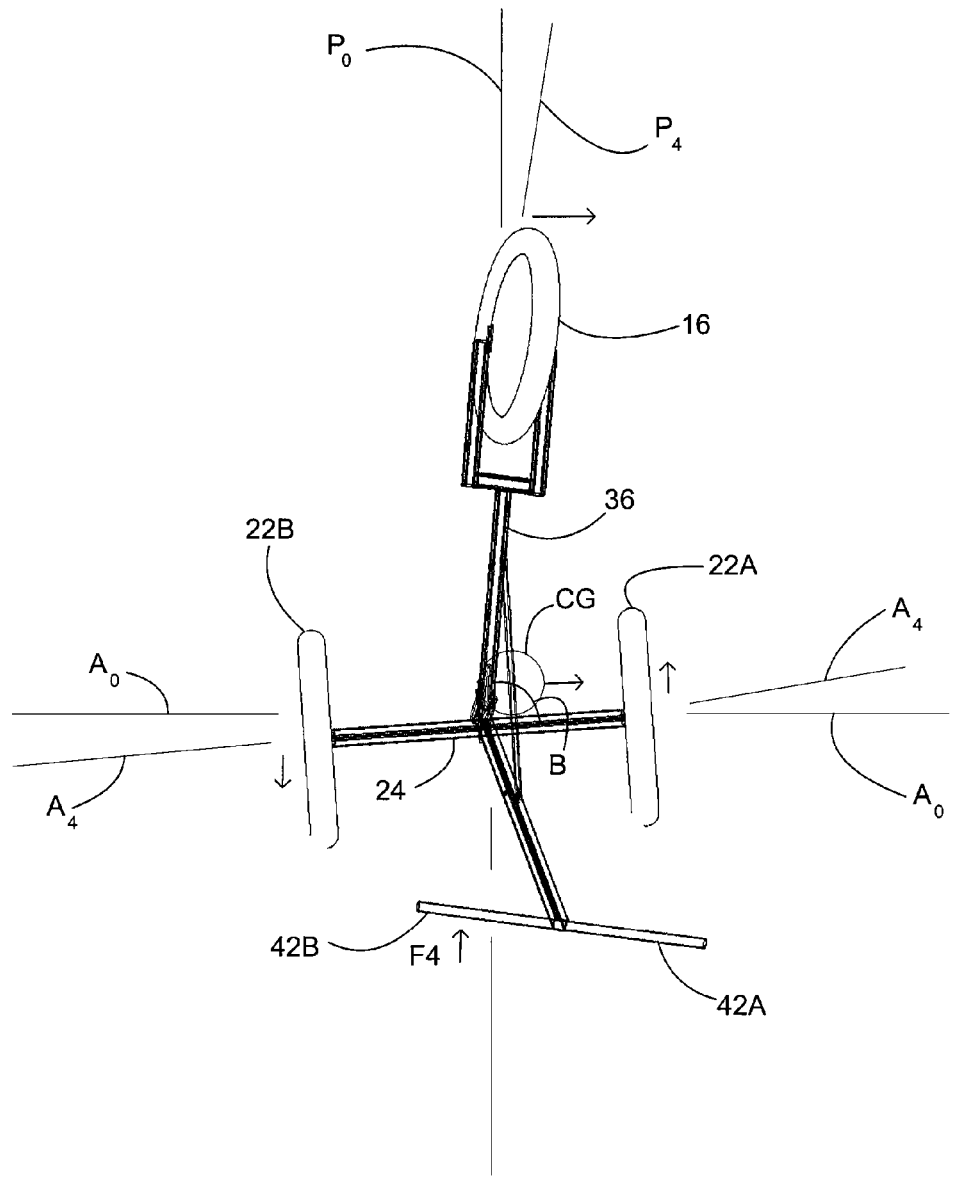
Figure 5C:
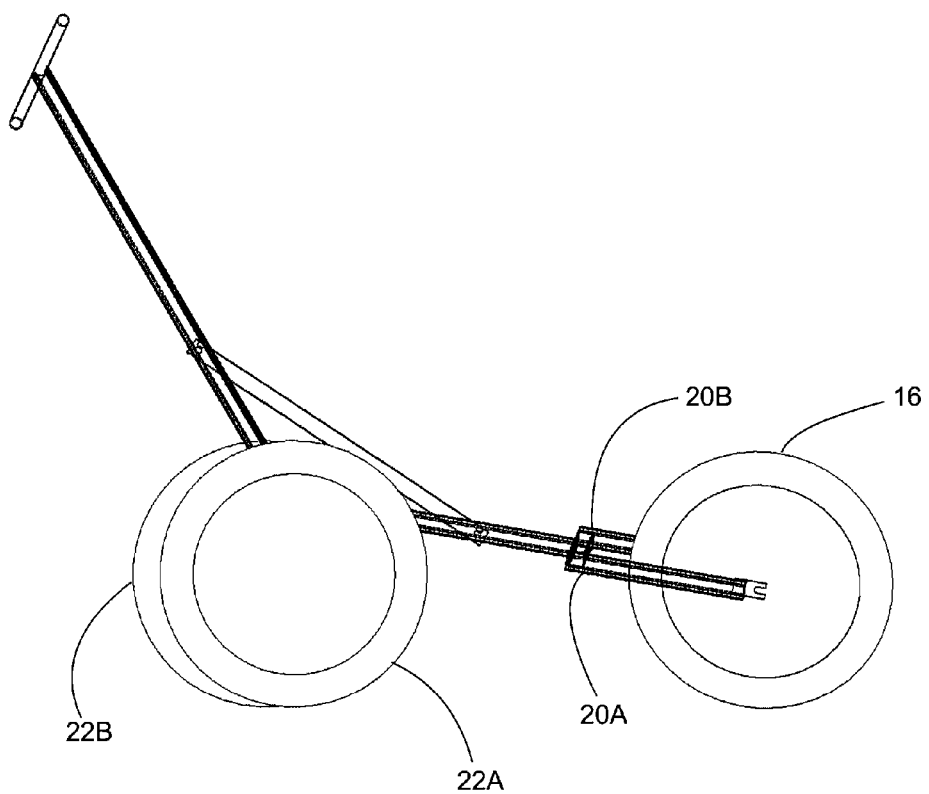
Figure 5D:
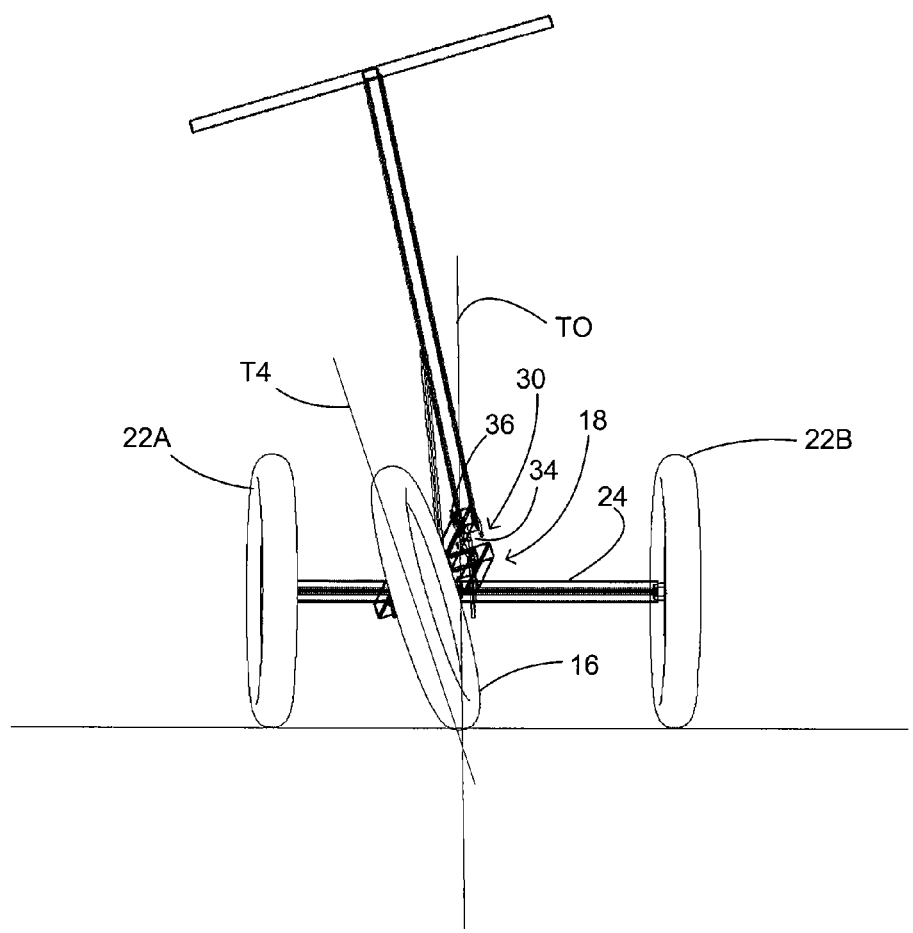
Figure 6:
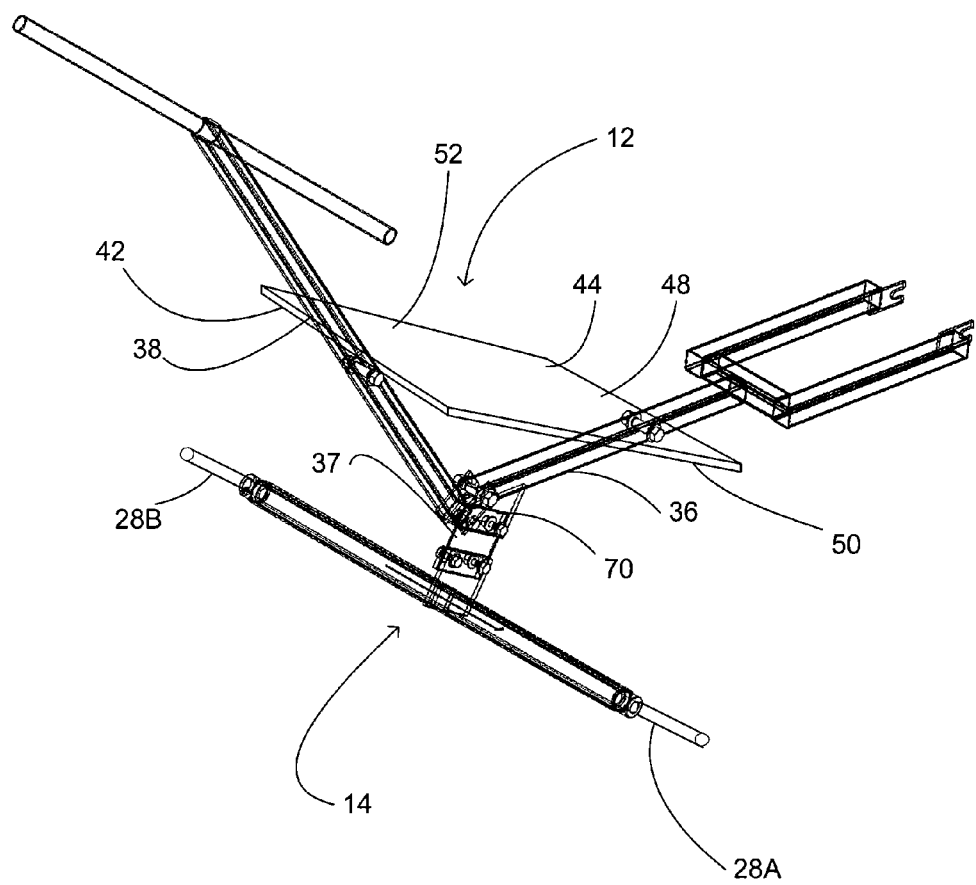
FIG. 6 is an isometric view of steerable running stroller conforming to aspects of the present invention, the view of FIG. 6 including one possible seat frame structure for supporting a fabric or other seat.

Referring now to the top views of the stroller shown in FIGS. 1B, 2B, 3B, 4B and 5B, the longitudinal center line of the stroller in the straight orientation (FIG. 1B, P0) may be compared to the centerline along member 36 in the two left turn positions (FIG. 2B, P1 and FIG. 3B, P2), and the centerline along member 36 in the two right turn positions (FIG. 4B, P3 and FIG. 5B, P4). Additionally, the line along the wheel axels A0 in the neutral/straight orientation (FIG. 1B) may be compared to the axel orientations A1 and A2 in the two left turn orientations (FIGS. 2B and 3B) and with the two right turn orientations (FIGS. 4B and 5B). First, it can be seen that the front wheel 16 moves left (positions P1 and P2) relative to neutral P0 when executing a left turn. Second, it can be seen that the front wheel 16 move right (positions P3 and P4) relative to neutral P0 when executing a right turn. Hence, by virtue of the position and orientation of the hinge 30 between the first and second frame assemblies (14, 12), the stroller provides for movement of the front wheel left or right relative to the rear wheels and the neutral orientation P0.

Still referring to the top views, it can also be seen that the rear axle 24 and hence the rear wheels 22A/22B also turn relative to the neutral orientation. In a straight rolling orientation, angle B between the rear axis and the longitudinal centerline P0 of the running stroller is about 90 degrees. When executing a left turn (FIGS. 2 and 3), the left wheel 22B moves forward relative to the neutral orientation of the left wheel (FIG. 1) and the right wheel 22A moves rearward relative to the neutral orientation of the right wheel. Hence, when executing a left turn, the axle rotates clockwise from orientation A0 to A1 to A2 about the hinge. Similarly, angle B increases relative to the straight rolling orientation. In contrast, while executing a right turn (FIGS. 4 and 5), the right wheel 24A moves forward relative to the neutral orientation of the right wheel (FIG. 1) and the left wheel 24B moves rearward relative to the neutral orientation of the left wheel. Hence, when executing a right turn, the axle rotates counterclockwise from orientation A0 to A3 to A4 about the hinge. Similarly, angle B decreases relative to the straight rolling orientation Hence, from a steering perspective, the rear wheels counter-steer to the front wheel helping to reduce the turning radius and reduce the amount of upper frame displacement (lean) compared to design without counter-steering, for example.

Now referring to FIGS. 1D, 2D, 3D, 4D and 5D, as well as others, it can also be seen that by virtue of the location and orientation of the hinge, the front wheel 16 and hence the upper/seat frame assembly 12 tilts left or tilts right when executing a left or right turn. The rear wheels 24A and 24B, unlike the front wheel, do not tilt during a turn. In the neutral orientation, the front wheel 16 is approximately transverse to the ground (T0), and when executing a left turn the wheel tilts left to positions T1 and T2, as well as various positions before, between, and after depending on the turn. Similarly, when executing a right turn, the front wheel tilts right to positions T3 and T4, as well as positions before, between, and after depending on the turn. Note, since, FIG. 2D, etc., are front views, the leftward or rightward tilting of the wheels, is seen as rightward or leftward tilting, respectively, as the use of terms "left" and "right" is relative to a runner pushing the stroller from the rear. Hence, the running stroller is able to effectively "lean" left or right into a left or right turn, as well as shift the center of gravity (CG) of the running stroller from a position generally vertically above and forward of the self centering hinge in the neutral orientation (See FIG. 1B) to a position left or right of the self centering hinge but still between the rear wheels (See FIGS. 2B, 3B, 4B, and 5B). The design facilitates a stable turn. Moreover, during sharper turns the center of gravity shifts further left of right, enhancing the stability of the stroller.

Given the shifting center of gravity during a turn, it may be advantageous to use a non-linear spring rate return/dampening member or members associated with the self centering hinge 30 or a non-linear spring rate carbon fiber member or members (or other virtual hinge assembly). In such an arrangement, a return force imparted by the self centering hinge 30 would increase as the turn increases to counter the non-linear force imparted by the shifting center of gravity. On returning the running stroller to a neutral/straight orientation, the return force would decrease as the stroller approaches the neutral position from a turning position. The non-linearity of the return force may or may not be detected by a user, as the weight and dimension of the rider, the sharpness of the turn (and degree of movement of the center of gravity) and the return force will all impact the runner's perception of the return force.

The turning geometries achieved by the running strollers discussed herein are advantageous over both a front wheel swivel jogging stroller and a fixed wheel jogging stroller. Should someone choose to run with a front wheel swivel stroller without the front wheel locked out, besides the risk of the front wheel unexpectedly swiveling into an improper orientation (if the wheel is bumped off the ground by an obstacle, the user pops the front wheel off the ground, etc.) front wheel swivel strollers do not lean into a turn or change the center of gravity. Hence, at higher speeds or during a sharp turn, there is some risk of rolling over or cartwheeling. With a fixed wheel jogging stroller, there is no turning mechanism; hence, the user most either skid the wheel left or right, which is very difficult unless the jogger is on dirt, snow or ice; or, more typically, the user most pivot the front wheel off the ground by pressing down the handles at the rear of the stroller. Such a pivoting maneuver is tiring for the jogger, and can cause some instability, especially if jogging at high speeds or if attempting to execute a sharp turn.

Figure 1B:
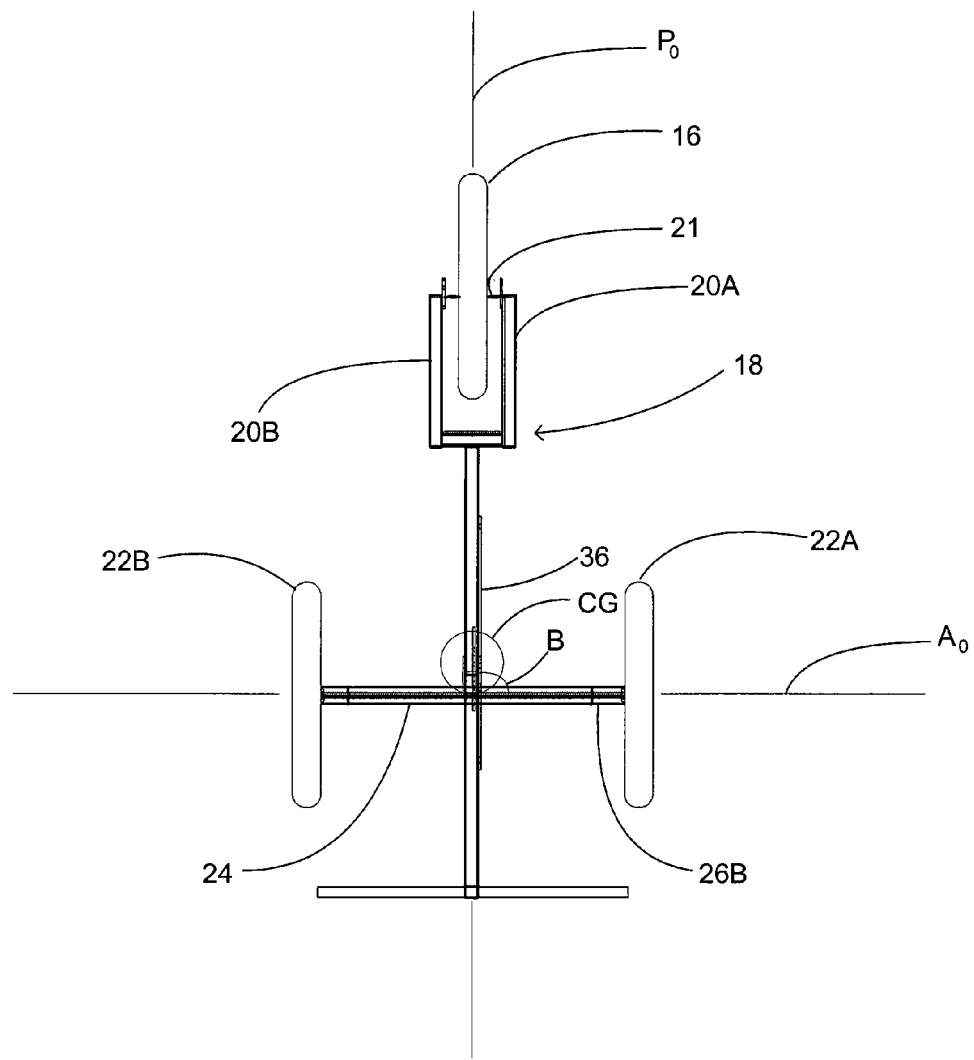
Figure 1C:
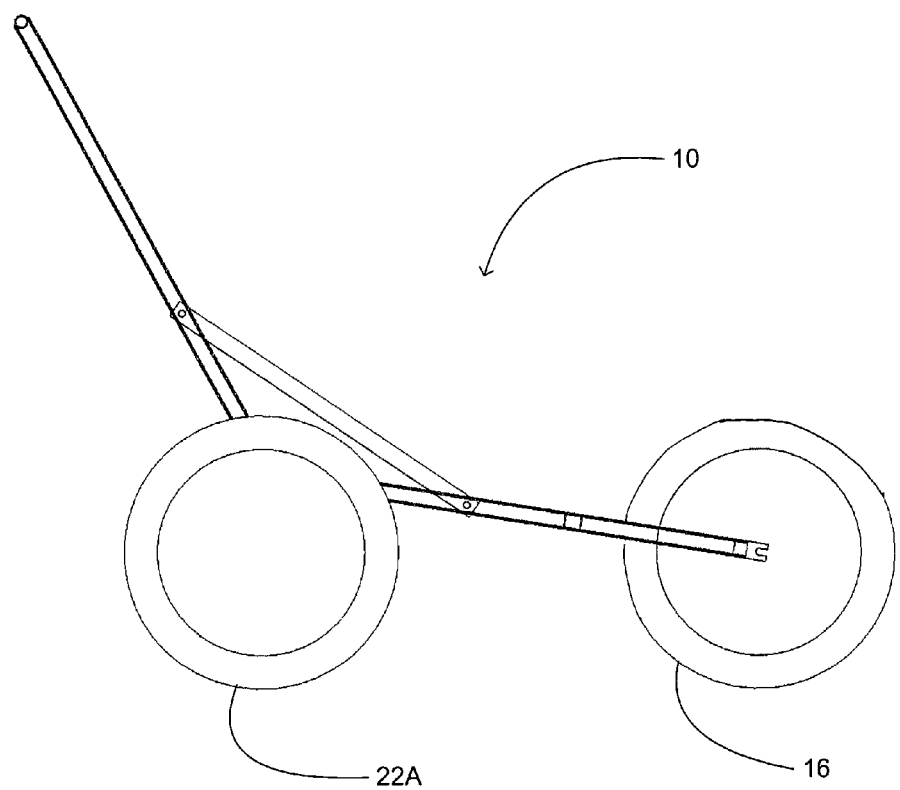
Figure 1D:
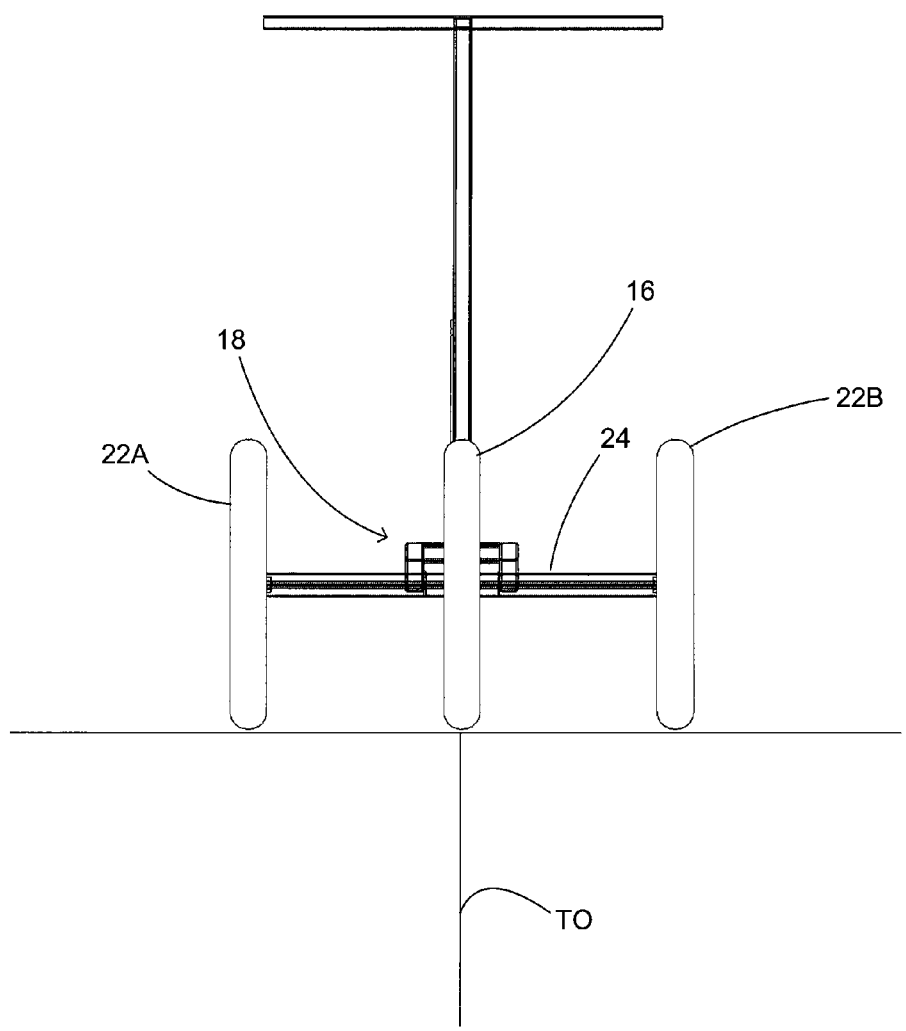
Figure 2A:
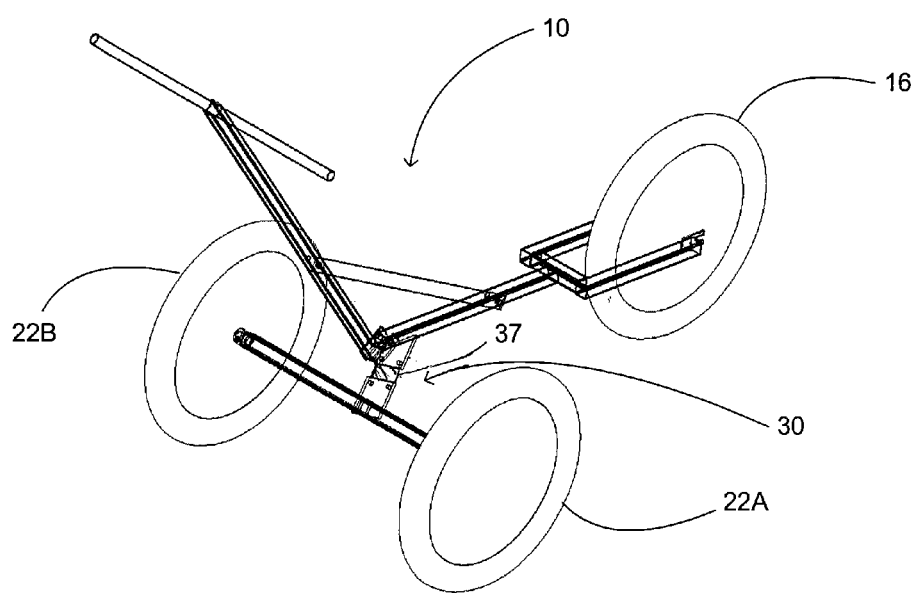
FIGS. 2A-2D are an isometric view, top view, side view and front view, respectively, of the steerable stroller shown in FIGS. 1A-1D, the stroller in a first left turn orientation.
Figure 2B:
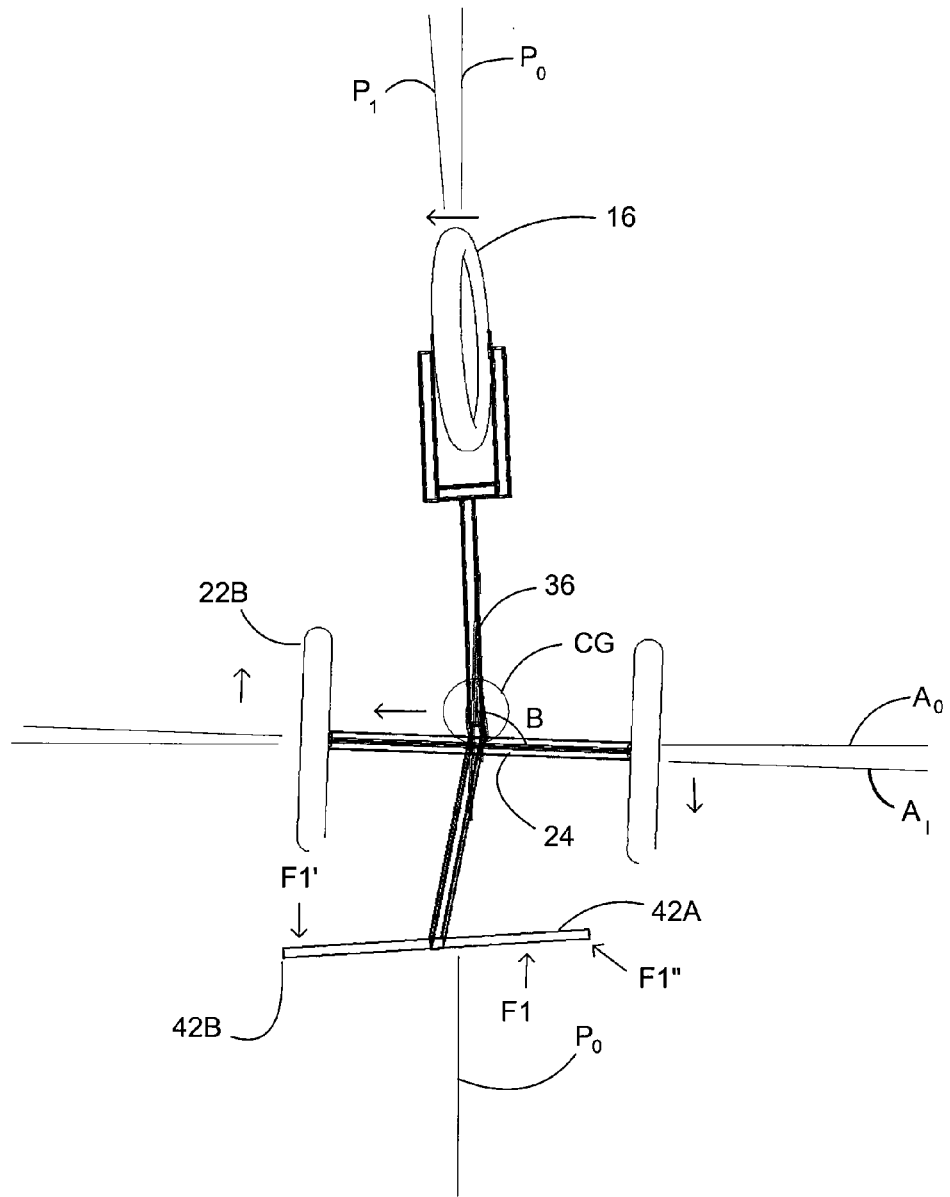
Figure 2C:
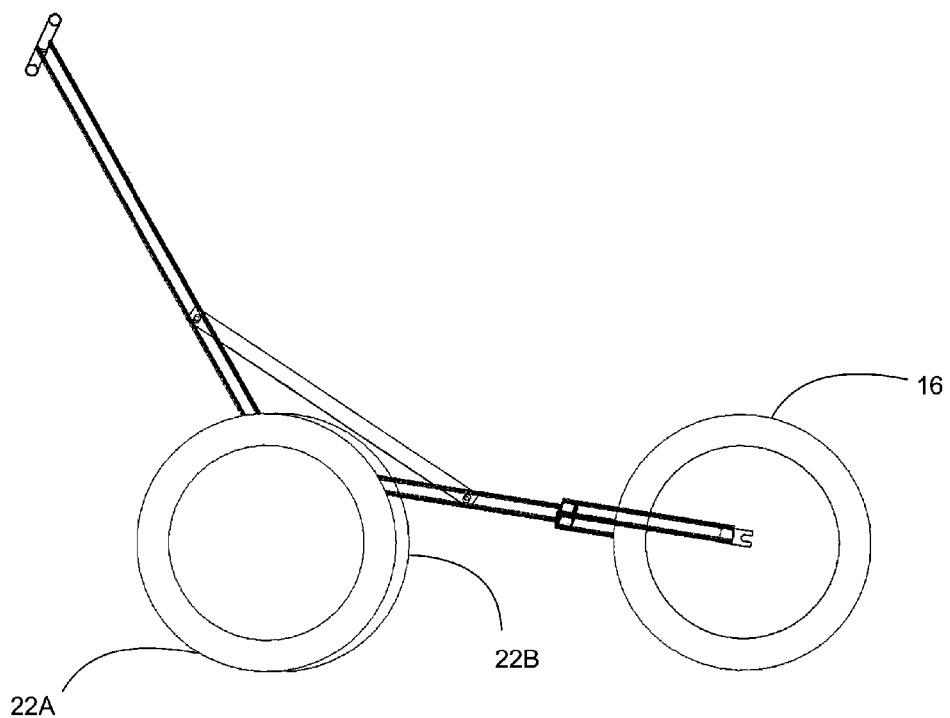
Figure 2D:
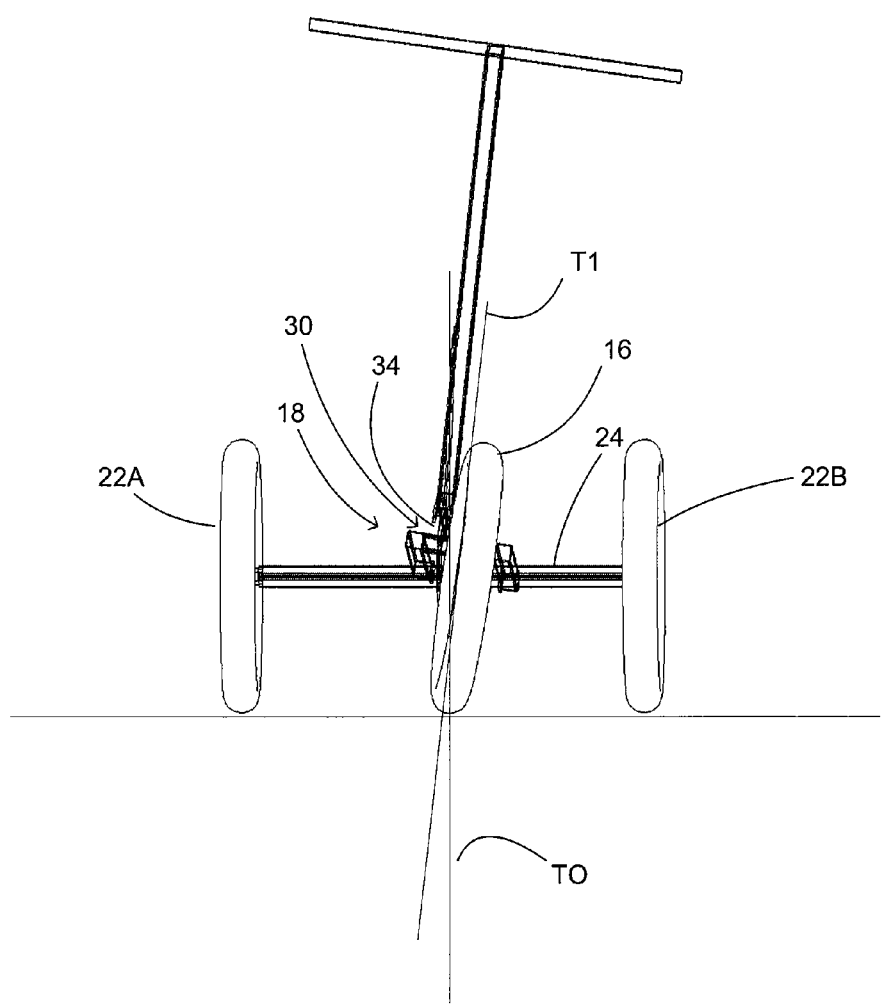
Figure 3A:
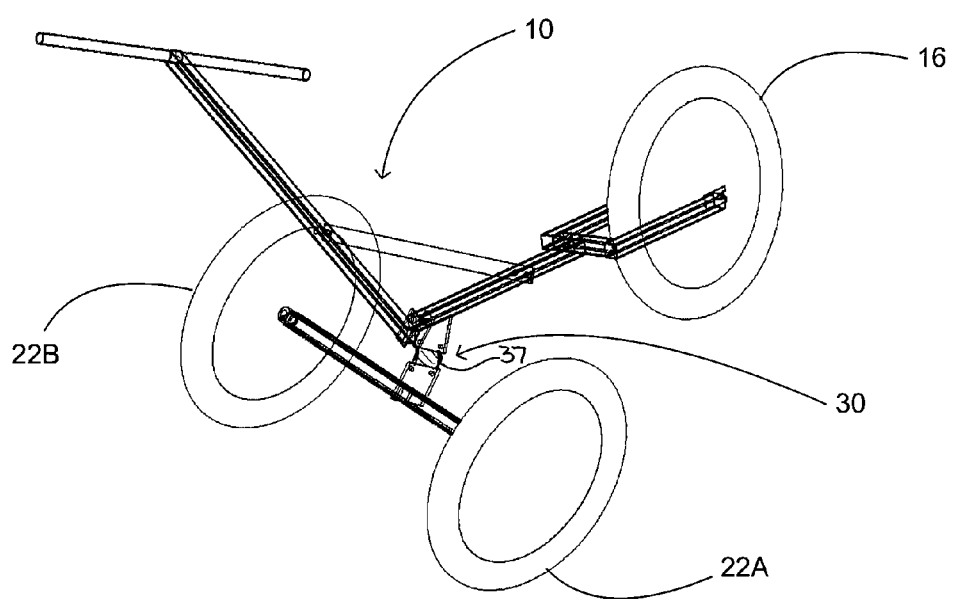
FIGS. 3A-3D are an isometric view, top view and side view, and front view respectively, of the steerable stroller shown in FIGS. 1A-1D, the stroller in a second left turn orientation, the left turn orientation of FIGS. 3A-3D being greater than shown in FIGS. 2A-2D.
Figure 3B:
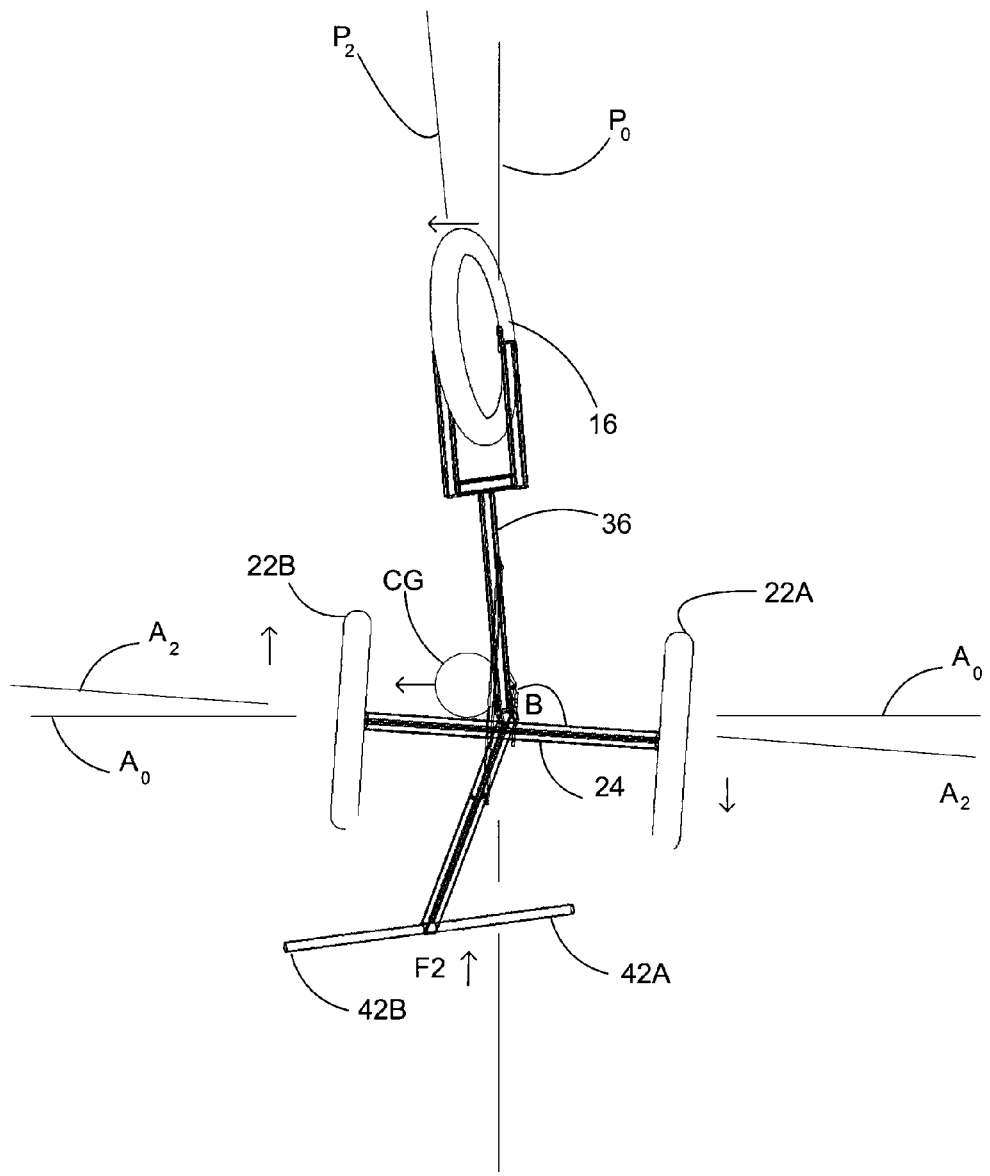
Figure 3C:
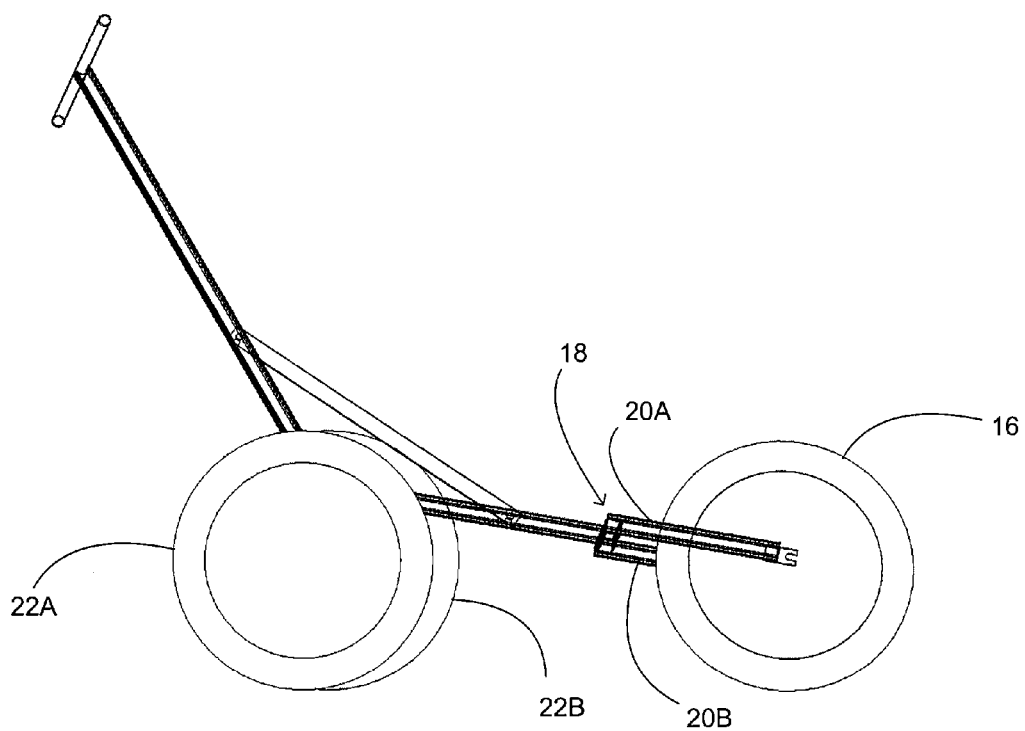
Figure 3D:
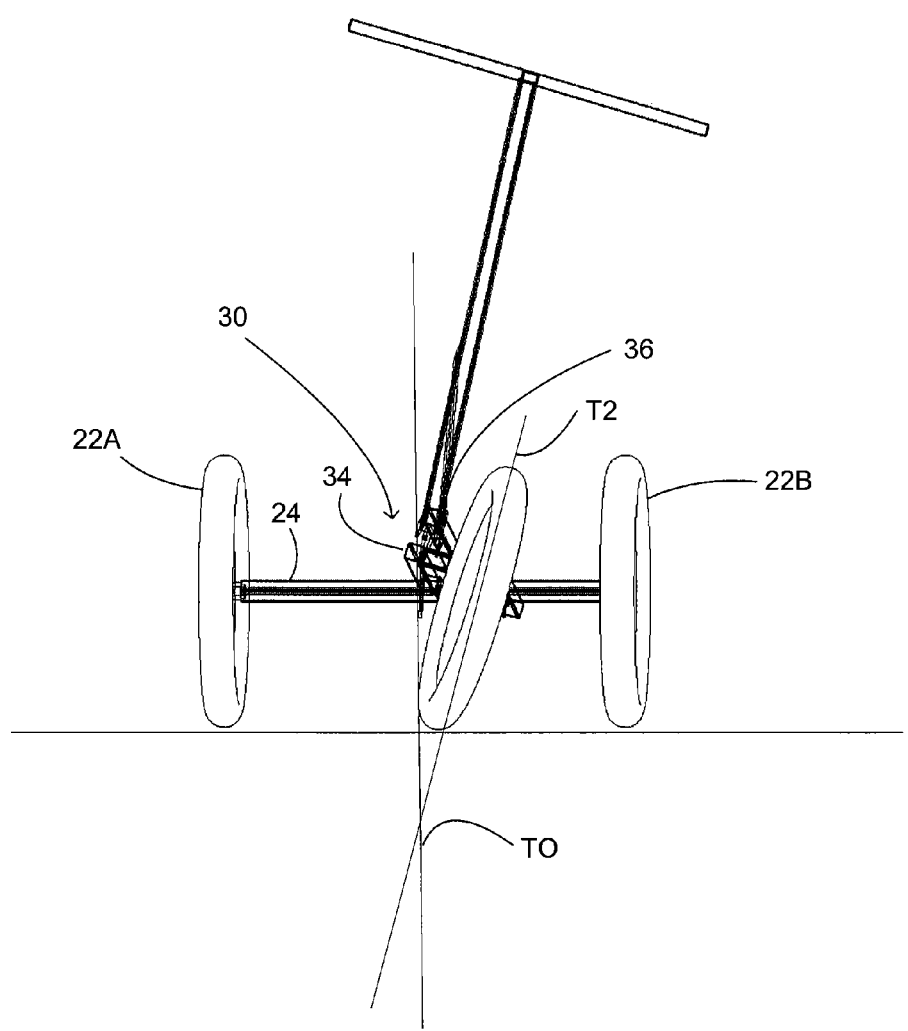

Straight forward movement of the running stroller 10 is achieved by maintaining the front axis 21 in a substantially parallel orientation with respect to the rear axis A0, such as in a conventional jogging stroller. The running stroller orientation set forth in FIGS. 1A-1C is in a straight orientation. Stated another way, straight forward movement of the running stroller is achieved by maintaining the front wheel 16 aligned with the rear wheels 22. The neutral position of the self centering hinge 30 orients the running stroller to run straight. Hence, the running stroller normally runs straight. Steering is achieved by creating an angular orientation between the front axis and the rear axis (i.e., angularly (left or right) orienting the front wheel with respect to the rear wheels) as well as tilting the front wheel left or right relative to the rear wheels. The virtual pivot or other self centering hinge arrangement, operates to return the stroller to a straight orientation after and/or during steering of the stroller. Thus, if a user causes a right turn such that the front wheel 16 is turned toward the right rear wheel 22A (see FIGS. 4 and 5), the virtual pivot flexes in response to steering force and also imparts a force that seeks to move the front of the wheel leftward (returning to the straight orientation). Similarly, when a user causes a left turn (see FIGS. 2 and 3) such that the front wheel 16 is turned toward the left wheel 22B, the virtual pivot flexes allowing the turn, and also imparts a force that seeks to move the front wheel back to the straight orientation when the turning force is removed.

During a turn, the virtual pivot or other self centering hinge 30 also assists in effecting the turn. By operating to return the stroller to the straightforward orientation during a turn, the virtual pivot causes the rear wheels to track or follow the turn of the front wheel. When the turning force is removed, the rear wheels align with the front wheel in the normal straight orientation.

FIGS. 6-10 illustrate the running stroller of FIGS. 1-5, with the wheels removed in order to better illustrate the self centering hinge, and further illustrating one possible seat frame assembly 44 coupled between the lower frame member 36 and the handle frame member 38. The seat assembly may be a fixed portion of the front wheel frame assembly or may be removably or foldably coupled therewith. When removably or foldably coupled, the seat assembly may be folded or removed for convenient storage or transportation of the stroller. Further, a user may exchange one seat assembly for another with a different arrangement, for example, a single seat arrangement exchanged for a two seat arrangement. The two seat arrangement may provide the seats in a side-by-side configuration or in a fore and aft configuration. If the stroller is configured for changing between a side-by-side double seat or a fore and aft double seat, the separation between the rear wheel or the overall length of the stroller may require alternation from the proportion shown in order to accommodate the larger design.

With the implementation shown in FIGS. 6-10, the frame 44 is configured to fit between the wheels and not rub on the wheels when executing a turn. The seat frame assembly includes a top member 46 generally parallel with a bottom member 48, and side members 50, 52 extending between the top and bottom members. In one implementation, the top and bottom members are the same length, and the side members are the same length; thus, the seat frame assembly forms a rectangular. In an alternative, shown in dashed line in FIG. 10, the top frame member 46A is longer than the bottom frame member 48A, while the two side members are the same length but sloping inward between the top frame member and lower frame member; thus, the seat frame assembly forms a trapezoid. During a turn, the seat frame assembly should not rub on the rear wheels. Hence, the frame assembly orientation on the front frame assembly, width (top and bottom members) and overall positioning should take into account the left and right turn orientation of the stroller and the position of the seat frame relative to the rear wheels.

Figure 8:
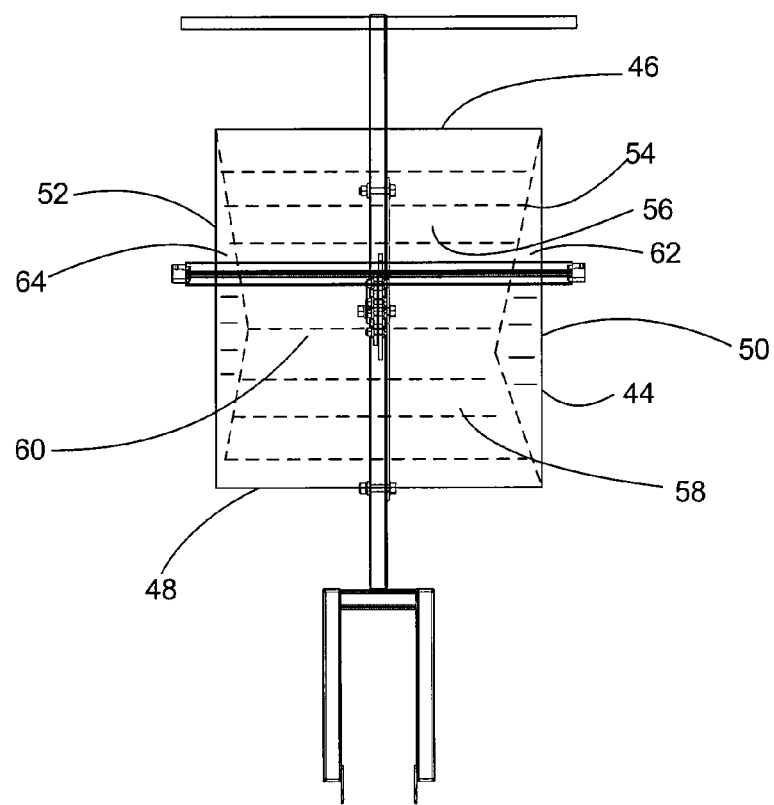
FIG. 8 is a bottom view of the running stroller illustrated in FIG. 7.
Figure 9:
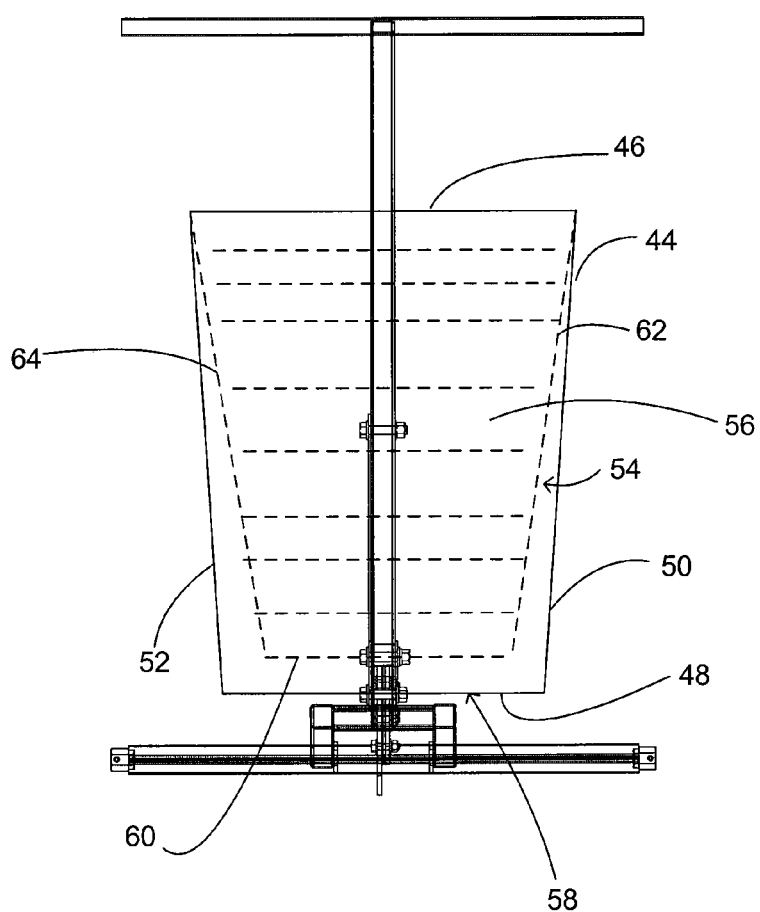
FIG. 9 is a front view of the running stroller illustrated in FIG. 7.

The top member 46 is coupled with the handle frame member 38 and the bottom member 48 is coupled with the lower frame member 36. A fabric seat 54 may be positioned between the frame members, and the fabric seat may include an integrated child restraint seat belt arrangement (not shown). The fabric seat 54 is shown in FIGS. 7, 8 and 9. The fabric seat includes an upper portion 56 that supports the riders back, head, and the like, and a lower portion 58 that the rider sits on and also supports the riders legs. The upper and lower sections intersect at location 60. It is possible to couple position 60 with frame in order to secure the fabric seat to the frame. The seat also includes side walls 62 and 64. The fabric seat may be removably coupled to the seat frame assembly, such as through a hook and loop fastener arrangement, e.g., Velcro™, snaps, buttons, or permanently attached.

Figure 10:
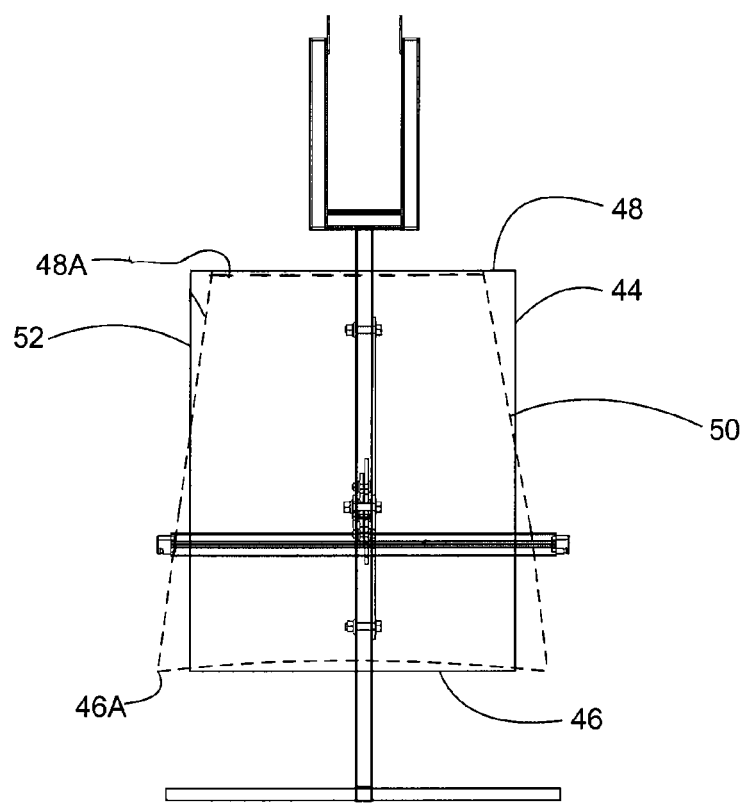
FIG. 10 is a top view of the running stroller illustrated in FIG. 7.

Referring to the trapezoidal seat frame assembly of FIG. 10, with a trapezoidal shape, more room for the rider may be provided along the back of the seat and the lower portion of the seat may be narrower. With the same rear wheel base (separation between the rear wheels) a trapezoidal seat frame shape allows for a shaper turn and more lean relative to rectangular seat frame shape without hitting the wheels. Since, a riders width at the shoulders is wider than at the hips and along the legs, the trapezoidal shape will provide the rider with seating room, but allow more effective turning radius relative to the rectangular design.

Referring now to FIG. 7, some proportional relationships between the lower frame 14, the rear axles 22A/22B, the upper frame 12, the self centering hinge 30, and the front wheel axle location are illustrated. Here, it can be seen the centering hinge 30 is provided between the rear axle 26B and the front axle 21 by a distance D1. With the hinge provided forward the rear axle, the rear wheels trail or counter-steer the front wheels. Further, the hinge is positioned above a line L1, defined between the front and rear wheel axles, by a distance D2. Also, the hinge 30 is positioned below the seat 54. Positioned as such, besides providing the stroller with the ability to both turn and tilt, the self centering hinge location also provides the stroller with enhanced stability by shifting the CG of the seat location forward the rear axle. Hence, the center of gravity of the stroller is forward the rear axle and between the axles enhancing the stability of the stroller.

With the hinge provided below the seat, the design provides for a self centering hinge to assist in reorienting the stroller to a neutral (straight) orientation when a turning force is removed from the stroller. With the self centering mechanism, whether integrated with a mechanical hinge, provided through a virtual hinge/pivot (e.g., a carbon fiber plate assembly 37) or with a mechanical hinge and external self centering mechanisms such as shown in U.S. application Ser. No. 11/745,437 "Steerable and Convertible Running Stroller" filed on May 7, 2007, which is incorporate by reference herein, the upper frame assembly does not flop over to one side or the other and is also in a straight orientation when no turning forces are applied.

In one possible implementation, the distance between the front and rear axle (distance D3 in FIG. 7) is about 29 inches. The distance D1, between the rear axle and a point in about the middle of the hinge, is about 2 inches. Hence, the distance D1 is about 6.8% of the distance D3, or between 3% and 25% in other possible examples, although the distances may vary depending on the implementation. The distance D2 is about 2 inches, but also may be varied between 1 and 7 inches in other possible examples, although the distances may vary depending on the implementation. The distance D3 however may be decreased, which would facilitate a sharper turning radius with less room for seating, amongst other impacts, and the distance D3 may be increased, which would facilitate a larger turning radius but with more fore and aft room for seating. The distance D2 may be similarly altered. Such geometrical changes may or may not be attended with self centering hinge angular orientation changes, hinge return force material changes, etc.

It is also possible to position the hinge in other locations relative to the seat, wheels, etc. For example, the hinge can be moved either forwardly or rearwardly relative to the position shown. Hence, for example, the hinge could be placed rearward of the rear wheels, or further forward between the wheels, relative to the position illustrated.

Implementations may also allow for the user to lock the upper frame 12 relative to the lower frame 14 to fix the running stroller in a straight orientation. In such an implementation, the stroller includes rigid latch or sleeve (not shown) that is positioned over the hinge so that the hinge cannot pivot left or right in response to forces on the handle 42.

To facilitate folding the stroller for transport, the upper frame assembly is hinged above the self centering hinge. Hence, a hinge 70 (see FIG. 6 as well as others) is provided between the members 36 and 38 of the upper frame assembly. The seat frame 50 may be removably coupled to members 36 and 38, and hence provide a lock for the hinge. With the seat detached or pivoted from either the lower member 36 or the upper member 38, depending on the implementation, the rear member 38 may be pivoted forward over the lower member 36.

Although various representative embodiments of this invention have been described above with a certain degree of particularity, those skilled in the art could make numerous alterations to the disclosed embodiments without departing from the spirit or scope of the inventive subject matter set forth in the specification. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected to another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A steerable running stroller comprising:
   a first frame assembly rotatably supporting a first rear wheel and a second rear wheel;
   a second frame assembly including a front wheel and a handle assembly, the second frame assembly further including a seat configured to support a child, and
   a hinge coupling the first frame assembly with the second frame assembly, the hinge oriented at an obtuse angle relative to a line between a front axis defined by the front wheel and a rear axis defined by the rear wheels, the hinge positioned completely below the seat; and
   the second frame assembly configured to displace from a neutral orientation relative to the first frame assembly when a turning force is applied through the handle assembly, and configured to return to the neutral orientation when the turning force is removed from the handle assembly.

2. The steerable running stroller of claim 1 wherein the hinge comprises a self centering hinge.

3. The steerable running stroller of claim 2 wherein the self centering hinge comprises at least one flexible and resilient member normally orienting the front wheel in alignment with the first rear wheel and the second rear wheel, the flexible and resilient member further arranged to bend when the turning force is imparted on the handle assembly and further arranged to impart a return force between the first frame assembly and the second frame assembly to return the normal orientation when the turning force is removed.

4. The steerable running stroller of claim 1 wherein the hinge comprises a mechanical hinge defining a mechanical axis oriented at the obtuse angle.

5. The steerable running stroller of claim 1 wherein the hinge comprises a virtual hinge comprising at least one flexible and resilient member, the flexible and resilient member defining a virtual axis oriented at the obtuse angle.

6. The steerable running stroller of claim 1 wherein the hinge is positioned between a front axle supporting the front wheel and at least one rear axle supporting the rear wheels such that the first rear wheel and the second rear wheel counter-steer the front wheel during a turn.

7. The steerable running stroller of claim 1 wherein the hinge is provided between the front wheel and the rear wheels and wherein the handle assembly extends rearward of the seat such that a runner pushing on the handle assembly may impart the turning force.

8. The steerable running stroller of claim 1 wherein the obtuse angle is about 145 degrees.

9. The steerable running stroller of claim 1 wherein the obtuse angle is between 130 degrees and 160 degrees.

10. The steerable running stroller of claim 1 wherein:
    the hinge is a self centering hinge mechanism defining a pivot axis orientated at the obtuse angle relative to a line between a front axis defined by the front wheel and a rear axis defined by the rear wheels, the pivot axis positioned between the front axis and the rear axis, the self centering hinge mechanism coupled between the first frame assembly and the second frame assembly, the self centering hinge mechanism configured to normally orient the running stroller in a straight orientation with the front wheel in alignment with the first and second rear wheels, the self centering hinge mechanism further arranged to impart a return force between the upper frame assembly and the lower frame assembly when the running stroller is pivoted about the pivot axis when executing a turn such that the front wheel turns and leans into a turn.

11. The steerable running stroller of claim 1 wherein the second frame assembly is configured to turn and tilt from a neutral orientation relative to the first frame assembly when the turning force is applied, and configured to return to the neutral orientation when the turning force is removed.

12. The steerable running stroller of claim 1 wherein the seat is supported on a seat frame removeably coupled with the second frame assembly, the second frame assembly defining a first member coupled to the hinge and a second member pivotally coupled with the first member, the second member supporting the handle assembly; wherein
when the seat assembly is removed, the second member may be pivoted relative to the first member such the stroller is configured in a transportation configuration.

13. A steerable running stroller comprising:
a lower frame assembly;
a first rear wheel and a second rear wheel rotatably supported on the lower frame assembly;
an upper frame assembly;
at least one front wheel supported on the upper frame assembly;
at least one seat operably supported on the upper frame assembly; and
a self centering hinge mechanism defining a pivot axis orientated at an obtuse angle relative to a line between a front axis defined by the front wheel and a rear axis defined by the rear wheels, the self centering hinge mechanism coupling the upper frame assembly and the lower frame assembly such that the at least one seat is completely above the self centering hinge assembly, the self centering hinge mechanism configured to normally orient the running stroller in a straight orientation with the front wheel in alignment with the first and second rear wheels, the self centering hinge mechanism further arranged to impart a return force between the upper frame assembly and the lower frame assembly when the running stroller is pivoted about the pivot axis when executing a turn such that the front wheel turns and leans into a turn.

14. The steerable running stroller of claim 13 wherein the self centering hinge mechanism comprises at least one flexible and resilient member coupled between the upper and lower frame assemblies.

15. The steerable running stroller of claim 14 further comprising a mechanical hinge defining the pivot axis.

16. The steerable running stroller of claim 13 wherein the self centering hinge mechanism comprises at least one flexible and resilient member, the at least one flexible and resilient member defining the pivot axis.

17. The steerable running stroller of claim 13 wherein the obtuse angle is between 130 degrees and 160 degrees.

18. The steerable running stroller of claim 13 wherein the self centering hinge is positioned between the front axis and the rear axis such that the rear wheels counter-steer the front wheel during a turn.

19. The steerable running stroller of claim 18 wherein the self centering hinge is between 1 and 7 inches forward the rear axis, and between 1 and 7 inches above the rear axis.

20. A steerable running stroller comprising:
a first frame assembly supporting a first rear wheel and a second rear wheel;
a second frame assembly supporting a front wheel, the second frame assembly supporting a seat configured to carry child;
a steering assembly coupled to the second frame assembly;
at least one flexible and resilient virtual pivot member coupled between the first frame assembly and the second frame assembly, the at least one virtual pivot member defining a pivot axis at an obtuse angle of between 130 degrees and 160 degrees between the front wheel and the rear wheels, the virtual pivot member positioned between the front wheel and the rear wheels and completely below the seat;
wherein, the first rear wheel and the second rear wheel counter steer the front wheel in response to a turning force on the steering assembly and the front wheel both turns and tilts in response to the turning force.

* * * * *